(12) United States Patent
Sivaramamurthy et al.

(10) Patent No.: US 9,967,097 B2
(45) Date of Patent: May 8, 2018

(54) METHOD AND SYSTEM FOR CONVERTING DATA IN AN ELECTRONIC DEVICE

(71) Applicant: Brillio LLC, Jersey, NJ (US)

(72) Inventors: Venkat Kumar Sivaramamurthy, Bangalore (IN); Karthik Gopalakrishnan Vinmani, Bangalore (IN); Renji Kuruvilla Thomas, Bangalore (IN); Puneet Gupta, Bangalore (IN); Gaurav Jain, Bangalore (IN)

(73) Assignee: BRillio LLC, Jersey City, NJ (US)

( * ) Notice: Subject to any disclaimer, the term of this patent is extended or adjusted under 35 U.S.C. 154(b) by 148 days.

(21) Appl. No.: 14/933,972

(22) Filed: Nov. 5, 2015

(65) Prior Publication Data

US 2017/0060777 A1 Mar. 2, 2017

(30) Foreign Application Priority Data

Aug. 25, 2015 (IN) ............ 4463/CHE/2015

(51) Int. Cl.
| | | |
|---|---|---|
| *H04L 9/14* | (2006.01) | |
| *G06F 21/62* | (2013.01) | |
| *G06F 12/14* | (2006.01) | |
| *H04L 9/08* | (2006.01) | |
| *H04W 12/04* | (2009.01) | |
| *H04W 12/02* | (2009.01) | |

(52) U.S. Cl.
CPC ............ *H04L 9/14* (2013.01); *G06F 21/6209* (2013.01); *H04L 9/0872* (2013.01); *H04L 9/0877* (2013.01); *H04W 12/04* (2013.01); *G06F 2221/2111* (2013.01); *G06F 2221/2113* (2013.01); *H04W 12/02* (2013.01)

(58) Field of Classification Search
CPC ...... G06F 21/62; G06F 12/1408; G06F 12/14; H04L 9/14; H04L 2209/24
See application file for complete search history.

(56) References Cited

U.S. PATENT DOCUMENTS 6,317,500 B1 11/2001 Murphy
6,948,062 B1 9/2005 Clapper
(Continued)

FOREIGN PATENT DOCUMENTS

WO 2012048404 A1 4/2012

OTHER PUBLICATIONS

"A Location Based Encryption Technique and Some of Its Applications" Logan Scott, GeoCodex LLC, LS Consulting Dorothy E. Denning, GeoCodex LLC, Naval Postgraduate School ION NTM 2003, Jan. 22-24, 2003, Anaheim, CA.*
(Continued)

*Primary Examiner* — Theodore C. Parsons
*Assistant Examiner* — Sameera Wickramasuriya (57) ABSTRACT

The embodiments herein provide a method for converting data in an electronic device. The method includes determining a plurality of parameters associated with a user and a zone. Further, the method includes generating a key using the plurality of parameters associated with the user and the zone. Further, the method includes converting the data in the electronic device from a first format to a second format using the key. Further, the method includes performing at least one action on the data in the second format.

27 Claims, 9 Drawing Sheets

(56) References Cited

U.S. PATENT DOCUMENTS

| | | | |
|---|---|---|---|
| 7,120,254 | B2 | 10/2006 | Glick et al. |
| 7,539,313 | B1 | 5/2009 | Hardjono et al. |
| 7,636,842 | B2* | 12/2009 | Kumoluyi ............. H04L 63/105 |
| | | | 713/166 |
| 8,391,488 | B2 | 3/2013 | Qiu et al. |
| 2002/0136407 | A1 | 9/2002 | Denning et al. |
| 2003/0110131 | A1* | 6/2003 | Alain ................... G06F 21/6209 |
| | | | 705/51 |
| 2003/0120940 | A1* | 6/2003 | Vataja ..................... G06F 21/10 |
| | | | 713/193 |
| 2007/0101438 | A1 | 5/2007 | Govindarajan |
| 2008/0226070 | A1 | 9/2008 | Herz |
| 2008/0288787 | A1* | 11/2008 | Hamilton ................ G01S 19/03 |
| | | | 713/193 |
| 2010/0278335 | A1 | 11/2010 | Enge et al. |
| 2011/0225423 | A1* | 9/2011 | Lynch ................... H04L 9/0827 |
| | | | 713/171 |
| 2014/0380047 | A1* | 12/2014 | Denning ............... H04L 9/0822 |
| | | | 713/168 |
| 2015/0128204 | A1* | 5/2015 | Lietz ....................... H04L 63/10 |
| | | | 726/1 |
| 2015/0379286 | A1* | 12/2015 | Nordback ........... G06F 21/6209 |
| | | | 713/165 |
| 2016/0171238 | A1* | 6/2016 | Sibillo ................ G06F 21/6227 |
| | | | 713/164 |
| 2016/0182471 | A1* | 6/2016 | Wilson .................... H04L 63/06 |
| | | | 713/164 |
| 2016/0197729 | A1* | 7/2016 | Jones .................. G06F 12/1408 |
| | | | 713/184 |
| 2016/0337136 | A1* | 11/2016 | Bester ................... H04W 12/10 |

OTHER PUBLICATIONS

"Generating encryption key using location data and other hardware data", Information Security Stack Exchange, Oct. 2014.

Marcos Portnoi et al., "Location-aware sign-on and key exchange using attribute-based encryption and Bluetooth beacons", IEEE, Oct. 2013, pp. 405-406.

Nisha Gholap et al., "Location and Authentication Based Encryption Scheme Application Design for Mobile Device", International Journal of Engineering Research & Technology, Apr. 2013, vol. 2, Issue 4.

* cited by examiner

METHOD AND SYSTEM FOR CONVERTING DATA IN AN ELECTRONIC DEVICE

This application claims the benefit of Indian Complete Application number 4463/CHE/2015 filed on Aug. 25, 2015.

TECHNICAL FIELD

The embodiments herein generally relate to electronic devices. More particularly to a mechanism for converting data in the electronic devices.

BACKGROUND OF THE INVENTION

Generally, people often prefer to maintain the confidentiality of the data that is being exchanged, stored, and so on using predefined mechanisms. Such mechanisms often involve encryption as access to encrypted data is limited. The data is encrypted using an encryption key to produce the encrypted data. To access the encrypted data, the same or a cryptographically-related encryption key is used to decrypt the data. The decrypted data can be accessed in standard manner.

In the conventional systems and methods, encrypted voice and data systems provide secure communication by sharing a single piece of information between the users. Thus, permitting only those users having knowledge about the same to properly decrypt the message. The piece of information is known as the encryption key variable, or key. Loading the key into the actual encryption device in a secure communication unit is a basic requirement that allows secure communication to occur. To retain security over a long period of time, the keys are changed periodically, typically weekly or monthly. Encryption is known to be performed on an end-to-end basis within a communication system, i.e., encrypting a message at the originating communication unit (also known as a mobile station), passing it transparently (i.e., without decryption) through any number of channels or pieces of infrastructure to the end user's communication unit, which decrypts the message.

In other conventional systems and methods, encryption is predefined and does not vary based on zone. In an example, consider a scenario where a user moves into the unsecured zone such as a public café. Here, the default level of encryption may not suitable to protect the communication link. Any key exchanges, if compromised, the communication link can be exposed to an eavesdropper.

The above information is presented as background information only to help the reader to understand the present invention. Applicants have made no determination and make no assertion as to whether any of the above might be applicable as Prior Art with regard to the present application.

OBJECT OF INVENTION

The principal object of the embodiments herein is to provide a mechanism to convert data from a first format to a second format in an electronic device using a key.

Another object of the embodiments herein is to provide a mechanism to determine a plurality of parameters associated with a user and a zone.

Another object of the embodiments herein is to provide a mechanism to generate a key using the plurality of parameters associated with the user and the zone.

Yet another object of the embodiments herein is to provide a mechanism for selecting a conversion scheme corresponding to the key.

Yet another object of the embodiments herein is to provide a mechanism to perform an action on the data in a second format.

SUMMARY

Accordingly the embodiments herein provide a method for converting data in an electronic device. The method includes determining a plurality of parameters associated with a user and a zone. Further, the method includes generating a key using the plurality of parameters associated with the user and the zone. Further, the method includes converting the data in the electronic device from a first format to a second format using the key. Further, the method includes performing at least one action on the data in the second format.

Accordingly the embodiments herein provide a method for converting data. The method includes determining, at a first electronic device, a plurality of parameters associated with a user and a zone. Further, the method includes generating, at the first electronic device, a first key using the plurality of parameters associated with the user and the zone. Further, the method includes converting, at the first electronic device, the data in a first format to a second format using the first key. Further, the method includes sending, by the first electronic device, the data in the second format to a second electronic device.

Accordingly the embodiments herein provide an electronic device for converting data. The electronic device is configured to determine a plurality of parameters associated with a user and a zone. By using the plurality of parameters, the electronic device is configured to generate a key. Further, the electronic device is configured to convert the data from a first format to a second format using the key and perform at least one action on the data in the second format.

Accordingly the embodiments herein provide a system for converting data. The system includes a first electronic device configured to determine a plurality of parameters associated with a user and a zone. The first electronic device configured to generate a first key using the plurality of parameters associated with the user and the zone. Further, the first electronic device is configured to convert the data in a first format to a second format using the first key. The data in the second format is sent to a second electronic device by the first electronic device. Further, the system includes the second electronic device configured to receive the data in the second format. The second electronic device is configured to determine the plurality of parameters associated with the user and the zone. By using the plurality of parameters, the second electronic device is configured to generate a second key. Further, the second electronic device is configured to convert the data in the second format to the first format using the second key.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein disclose a method for converting data in an electronic device. The method includes determining a plurality of parameters associated with a user and a zone. The method includes generating a key using the plurality of parameters associated with the user and the zone. Further, the method includes converting the data in the electronic device from a first format to a second format using the key. Furthermore, the method includes performing at least one action on the data in the second format.

In an embodiment, converting the data in the electronic device from the first format to the second format using the key includes selecting a conversion scheme corresponding to the key. The data is converted from the first format to the second format using the conversion scheme.

In an embodiment, the action includes storing the data in the second format in the electronic device, sending the data in the second format to another electronic device, or the like.

In an embodiment, the parameter associated with the zone includes a location key, a zone key, a zone identifier, a level of security, a dynamic number associated with a zone, a key size, a type of conversion scheme to be used, or the combination of the same.

In an embodiment, the parameter associated with the user includes a user identifier, an application identifier, an application key, a user application key, a service key, a device key, or the combination of the same.

In an embodiment, the first format is an open format and the second format is a protected format.

In an embodiment, the first format is a protected format and the second format is an open format.

Another embodiment herein discloses a method for converting data. The method includes determining, at a first electronic device, a plurality of parameters associated with the user and the zone. By using the plurality of parameters, the first electronic device generates a first key. Further, the method includes converting, by the first electronic device, the data in the first format to the second format using the first key. The data in the second format is sent to a second electronic device by the first electronic device.

In an embodiment, the first format is the open format and the second format is the protected format.

Unlike the conventional systems and methods, the proposed method provides a mechanism for selecting an encryption scheme for encrypting the data based on a zone classification. The encryption parameters such as the key size and the type of encryption scheme are modified based on the zone classification such as highly secured, medium secured and unsecured zones. Further, the proposed method does not allow key exchanges to take place between the electronic device and the server before allowing the encryption, thus making the communication channel more secure.

Referring now to the drawings, and more particularly to FIGS. 1a through 8, where similar reference characters denote corresponding features consistently throughout the figures, there are shown preferred embodiments.

Figure 1A:
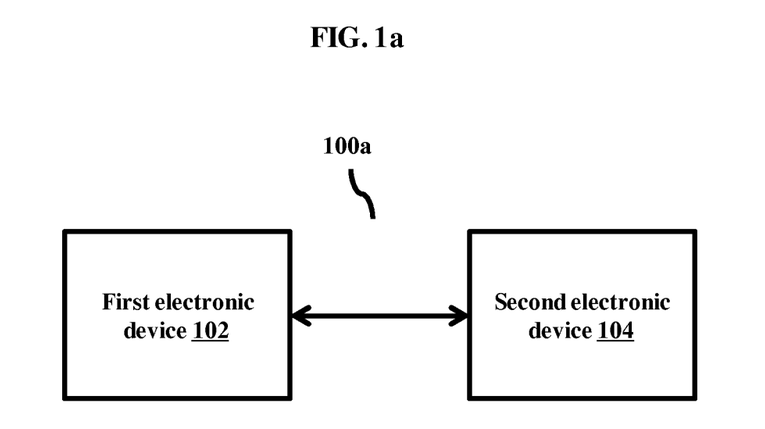
FIG. 1a illustrates a system for converting data, according to embodiments disclosed herein.

FIG. 1a illustrates a system 100a for converting data, according to embodiments disclosed herein. As depicted in the FIG. 1a, the system 100a includes a first electronic device 102 and a second electronic device 104. Further, the system can additionally include a zone 106 as shown in FIG. 1b.

Figure 1B:
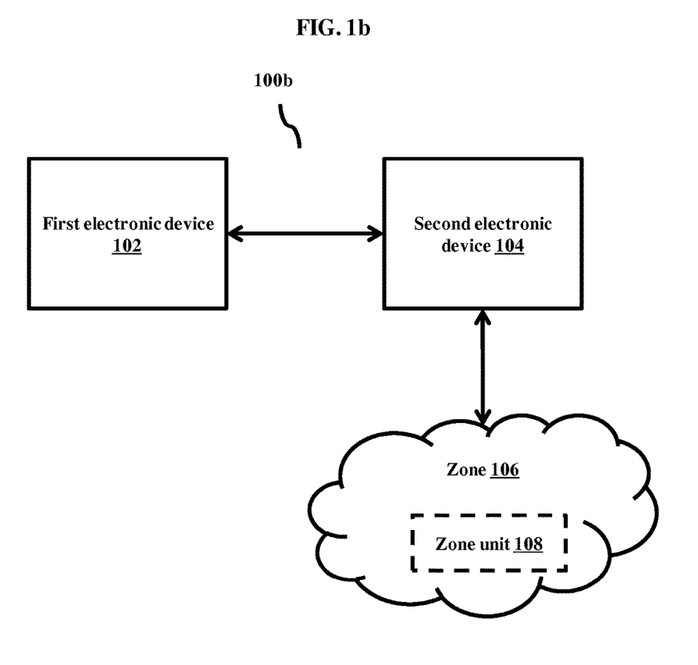
FIG. 1b illustrates another system for converting data, according to embodiments disclosed herein.

FIG. 1b illustrates a system 100b for converting data, according to embodiments disclosed herein. The system 100b includes the first electronic device 102, the second electronic device 104, and the zone 106. The zone 106 includes a zone unit 108.

The first electronic device 102 can be, for example but not limited to a laptop, a desktop computer, a mobile phone, a smart phone, Personal Digital Assistants (PDAs), a tablet, a smart watch, a phablet, a consumer electronic device, or any other electronic device. The second electronic device 104 can be a server. In an embodiment, the zone unit 108 can be at the server.

Initially, a user may access the zone unit 108 and view a map of a geographical area. The user may assign various geo-fences on the map and assign zone and zone related parameters. The assigned information is stored in the zone unit 108. Consider a scenario where a user enters the zone 106 and intends to establish a communication channel through the first electronic device 102 with the second electronic device 104. The first electronic device 102 determines the plurality of parameters associated with the user and the zone 106. In an embodiment, the parameter associated with the zone 106 includes a location key, a zone key, a zone identifier, a level of security (such as highly secured, medium secured, or unsecured zone), a dynamic number associated with the zone 106, a key size, a type of conversion scheme to be used, or the combination of the same. In an example, the type of conversion scheme can be an encryption scheme to encrypt data. In an embodiment, the parameter associated with the user includes a user identifier, an application identifier, an application key, a user application key, a service key, a device key, or combination of the same.

After determining the plurality of parameters, the first electronic device 102 can be configured to generate a first key. In an embodiment, the first key can be an encryption key. By using the first key, the first electronic device 102 can be configured to convert the data from a first format to a second format. In an embodiment, the first format is an open format and the second format is a protected format. In an example, the first electronic device 102 can use the encryption scheme as specified in the parameters associated with the zone 106 and the generated first key to encrypt the communication channel. The first electronic device 102 can be configured to send the data in the second format to the second electronic device 104.

After receiving the data in the second format, the second electronic device 104 can be configured to determine the plurality of parameters associated with the user and the zone. A second key is generated by the second electronic device 104 using the plurality of parameters. In an embodiment, the second key is generated independent of the first key. In an example, the second key can be a decryption key. In an example, the second electronic device 104 generates the decryption key by determining the zone 106 from where the communication is originated and the device key, user identifier through an initial authentication performed between the first electronic device 102 and the second electronic device 104. The second electronic device 104 can be configured to convert the data in the second format to the first format using the second key. In an example, the second electronic device 104 decrypts the data.

Unlike the conventional systems, the system 100a and 100b provides a secured communication channel between the first electronic device 102 and the second electronic device 104.

Though the FIG. 1a and FIG. 1b shows a limited overview of the system 100a and 100b, it is to be understood that other embodiments are not limited thereto. Further, the system 100a and 100b can include any number of electronic devices along with other hardware or software components communicating with each other.

Figure 2:
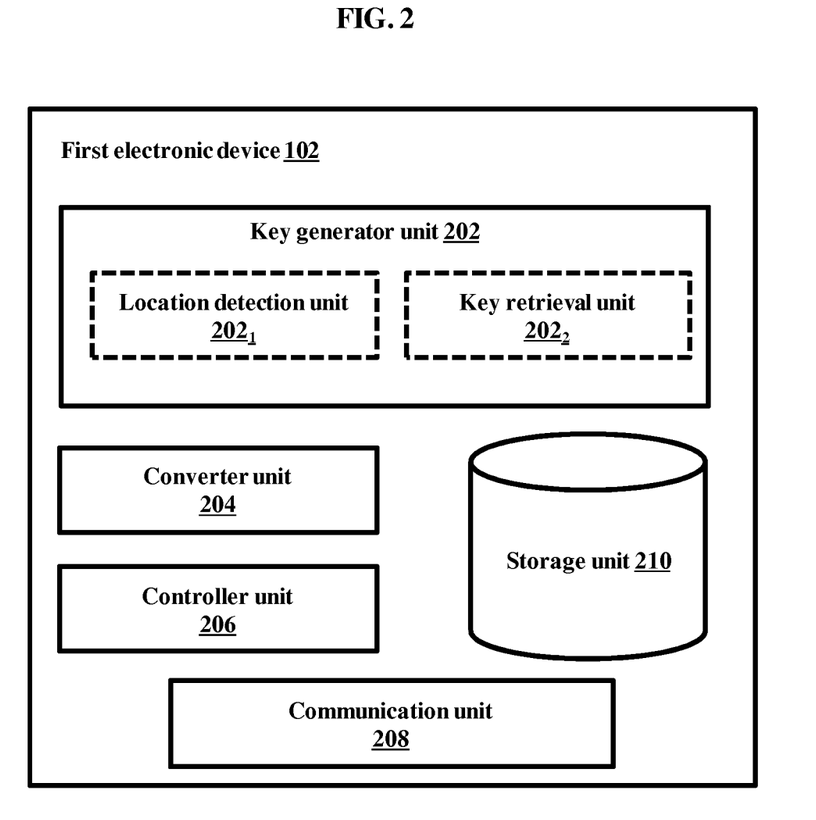
FIG. 2 illustrates various units of a first electronic device for converting data, according to embodiments disclosed herein.

FIG. 2 illustrates various units of the first electronic device 102 for converting data, according to embodiments disclosed herein. In an embodiment, the first electronic device 102 includes a key generator unit 202, a converter unit 204, a controller unit 206, a communication unit 208, and a storage unit 210. The key generator unit 202 includes a location detection unit $202_1$ and a key retrieval unit $202_2$.

The location detection unit $202_1$ identifies the location of the user through global positioning system (GPS) or API by an underlying operating system. The GPS operates by processing received satellite signals to determine location, movement, and time associated with the user; at least three GPS satellite signals are required to determine the locations in three dimensions. The GPS functionality is described for exemplary purposes only, and other positioning technology, coordinate systems, or geodesic reference systems may be utilized for detecting the location.

After determining the location, the key retrieval unit $202_2$ can be configured to retrieve the plurality of parameters associated with the zone 106 such as the application key, the user key, and the zone key from the storage unit 210 for dynamically generating the key. If the plurality of parameters is not available in the storage unit 210 then, the key retrieval unit $202_2$ communicates with the second electronic device 104 for extracting the zone key, the key size, and the type of conversion scheme to be used.

The key generator unit 202 can be configured to generate the first key using the plurality of parameters associated with the zone and the user. The converter unit 204 converts the data from the first format to the second format using the generated first key. In an example, the data is encrypted based on the generated first key. The controller unit 206 can be configured to perform at least one action on the data in the second format. The communication unit 208 sends the data in the second format to the second electronic device 104. Further, the communication unit 208 can be configured for communicating with external devices via one or more networks, such as one or more wireless networks.

The storage unit 210 maintains the plurality of parameters associated with the zone 106 and the user. The storage unit 210 maintains the application key and the user key in a key database in the storage unit 210 as shown in Table-1. Further, the storage unit 210 maintains mapping of the location identifier or the zone identifier with the zone key, the type of conversion scheme to be used, and the key size in a zone database as shown in Table-2.

Key Database:

TABLE 1

| Application Key | User key |
|---|---|

Zone Database:

TABLE 2

| Location/Zone Identifier | Zone key | Type of scheme to be used | Key size |
|---|---|---|---|

Further, the storage unit 210 may include one or more computer-readable storage media. The storage unit 210 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 210 may, in some examples, be considered a non-transitory storage medium. The term "non-transitory" may indicate that the storage medium is not embodied in a carrier wave or a propagated signal. However, the term "non-transitory" should not be interpreted that the storage unit 210 is non-movable. In some examples, the storage unit 210 can be configured to store larger amounts of information than the memory. In certain examples, a non-transitory storage medium may store data that can, over time, change (e.g., in Random Access Memory (RAM) or cache).

The FIG. 2 shows a limited overview of the first electronic device 102 but, it is to be understood that other embodiments are not limited thereto. The labels or names of the units are used only for illustrative purpose and does not limit the scope of the invention. Further, the first electronic device 102 can include any number of units or sub-units communicating among each other along with the other components of the system 100a and 100b. Likewise, the functionalities of each unit can be combined by a single unit or can be distributed among each other in a manner different than described herein without departing from the scope of the invention.

Figure 3:
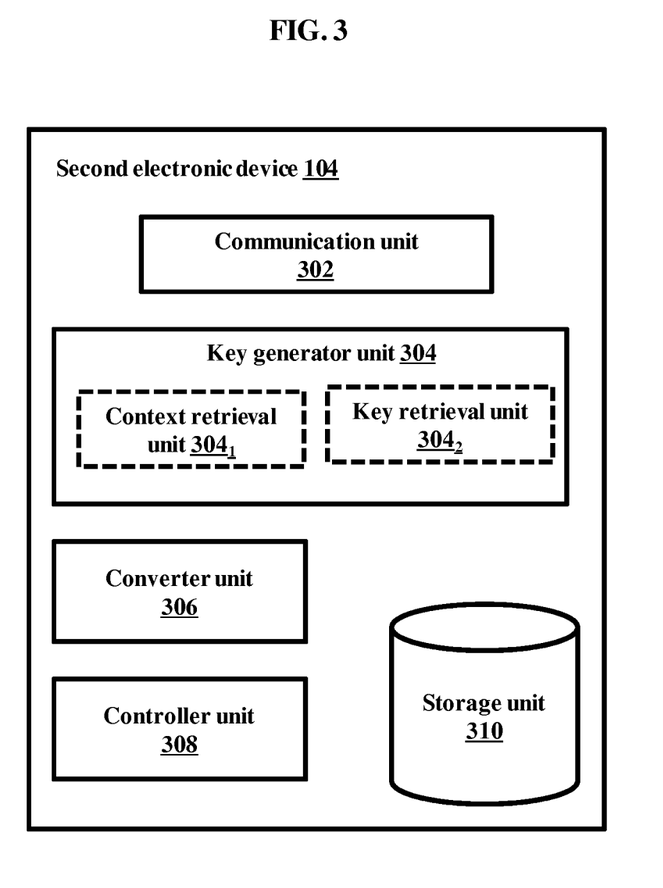
FIG. 3 illustrates various units of a second electronic device for converting data, according to embodiments disclosed herein.

FIG. 3 illustrates various units of the second electronic device 104 for converting data, according to embodiments disclosed herein. In an embodiment, the second electronic device 104 includes a communication unit 302, a key generator unit 304, a converter unit 306, a controller unit 308, and a storage unit 310. The key generator unit 304 includes a context retrieval unit $304_1$, and a key retrieval unit $304_2$.

The communication unit 302 receives the data in the second format from the first electronic device 102. Further, the communication unit 302 can be configured for communicating with one or more external devices via one or more networks, such as one or more wireless networks. After receiving the data in the second format, the context retrieval unit $304_1$ uses the information provided by the user at the start of the communication session to identify and store the information of the user key, application key, and the location. The key retrieval unit $304_2$ retrieves the plurality of parameters for generating the second key dynamically based on the plurality of parameters such as the user key, the application key, and the location information extracted from the context retrieval unit $304_1$. After retrieving the plurality of parameters, the key generator unit 304 can be configured to generate the second key. In an example, the second key can be the decryption key. The converter unit 306 can be configured to convert the data in the second format to the first format using the generated second key. The second key is generated independent of the first key. The controller unit 308 can be configured to perform the action on the data in the first format.

The storage unit 310 maintains the plurality of parameters associated with the zone 106 and the user. The plurality of parameters are stored across the different registered users, applications, and locations. The storage unit 310 maintains the application identifier, the application key, and the user key in an application database as shown in Table-3. Further, the storage unit 310 maintains the user identifier, the application identifier, and the user application specific key in a user key database as shown in Table-4. Further, the storage unit 310 maintains mapping of the application identifier with the location identifier or the zone identifier, the zone key, the type of conversion scheme to be used, and the key size in a zone database as shown in Table-5.

Key Database:

Application Database:

TABLE 3

| Application Id | Application Key | User specific Key |
| --- | --- | --- |

User Key Database:

TABLE 4

| User Id | Application Id | User Application specific Key |
| --- | --- | --- |

Zone Database:

TABLE 5

| Application Id | Location/ Zone Id | Zone Key | Encryption/decryption scheme to be used | Key size |
| --- | --- | --- | --- | --- |

Further, the storage unit 310 may include one or more computer-readable storage media. The storage unit 310 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the storage unit 310 may, in some examples, be considered a non-transitory storage medium. The term "non-transitory" may indicate that the storage medium is not embodied in a carrier wave or a propagated signal. However, the term "non-transitory" should not be interpreted that the storage unit 310 is non-movable. In some examples, the storage unit 310 can be configured to store larger amounts of information than the memory. In certain examples, a non-transitory storage medium may store data that can, over time, change (e.g., in Random Access Memory (RAM) or cache).

The FIG. 3 shows a limited overview of the second electronic device 104 but, it is to be understood that other embodiments are not limited thereto. The labels or names of the units are used only for illustrative purpose and does not limited the scope of the invention. Further, the second electronic device 104 can include any number of units or sub-units communicating among each other along with the other components of the system 100a and 100b. Likewise, the functionalities of each unit can be combined by a single unit or can be distributed among each other in a manner different than described herein without departing from the scope of the invention.

Figure 4:
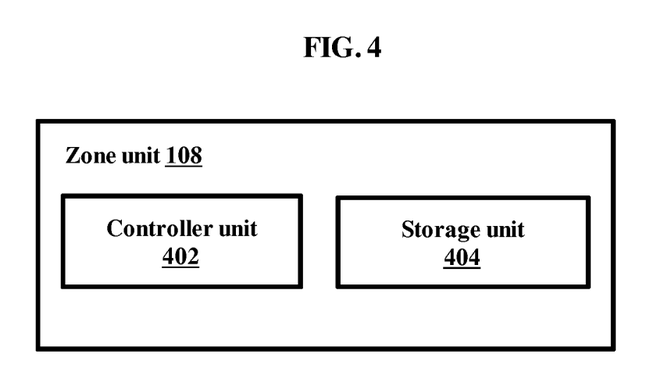
FIG. 4 illustrates various units of a zone unit, according to embodiments disclosed herein.

FIG. 4 illustrates various units of the zone unit 108, according to embodiments disclosed herein. In an embodiment, the zone unit 108 includes a controller unit 402 and a storage unit 404.

In an embodiment, the zone unit 108 can be at the server. The user may access the controller unit 402 to view the map and assigns various geo-fences on the map. Further, the user may assign zone 106 and keys to the zone 106. Also, the user may assign plurality of parameters to the zone 106. The information can be captured in the storage unit 404. The storage unit 404 captures the zone 106 and the plurality of parameters associated with the zone 106. The storage unit 404 maintains the mapping of the application identifier with the location or zone identifier, the zone key, the type of the conversion scheme to be used, and the key size as shown in the Table-6 below.

TABLE 6

| Application Identifier | Location/Zone Identifier | Zone Key | Type of conversion scheme to be used | Key size |
| --- | --- | --- | --- | --- |

The FIG. 4 shows a limited overview of the zone unit 108 but, it is to be understood that other embodiments are not limited thereto. The labels or names of the units are used only for illustrative purpose and does not limit the scope of the invention. Further, the zone unit 108 can include any number of units or sub-units communicating among each other along with the other components of the system 100b.

Likewise, the functionalities of each unit can be combined by a single unit or can be distributed among each other in a manner different than described herein without departing from the scope of the invention.

Figure 5:
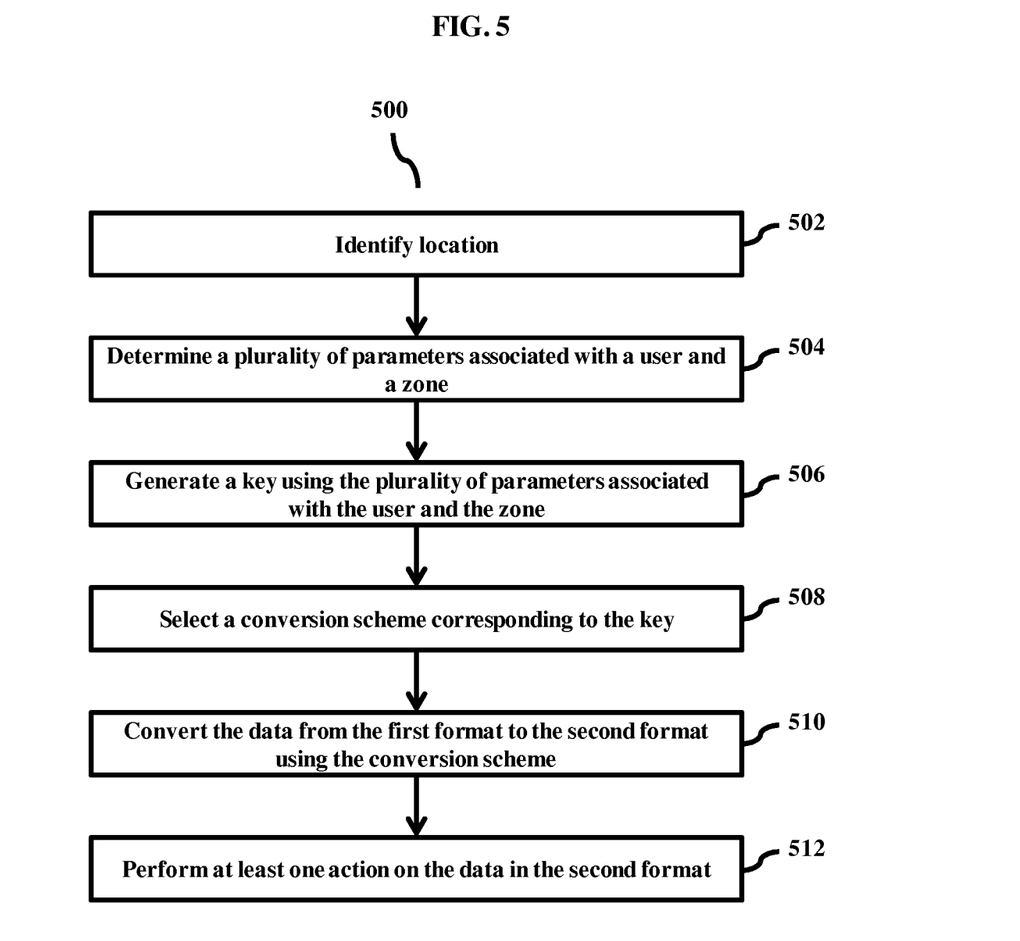
FIG. 5 is a flow chart illustrating a method for converting data in an electronic device, according to embodiments disclosed herein.

FIG. 5 is a flow chart illustrating a method 500 for converting data in the first electronic device 102 or the second electronic device 104, according to embodiments as disclosed herein. At step 502, the method 500 includes identifying the location. In an embodiment, the method 500 allows the location detection unit $202_1$ to identify the location. In another embodiment, the method 500 allows the context retrieval unit $304_1$ to identify the location.

At step 504, the method 500 includes determining the plurality of parameters associated with the user and the zone. In an embodiment, the method 500 allows the key retrieval unit $202_2$ to determine the plurality of parameters associated with the user and the zone. In another embodiment, the method 500 allows the Key retrieval unit $304_2$ to determine the plurality of parameters associated with the user and the zone. In an embodiment, the parameter associated with the zone includes the location key, the zone key, the level of security, the dynamic number associated with the zone, the key size, the type of conversion scheme to be used, or the combination of the same. The type of conversion scheme can be the encryption scheme to encrypt the data or the decryption scheme to decrypt the data. In an embodiment, the parameter associated with the user includes the user identifier, the application identifier, the application key, the user application key, the service key, the device key, or the combination of the same.

At step 506, the method 500 includes generating the key using the plurality of parameters associated with the user and the zone. In an embodiment, the method 500 allows the key generator unit 202 to generate the key using the plurality of parameters associated with the user and the zone. In another embodiment, the method 500 allows the key generator unit 304 to generate the key using the plurality of parameters associated with the user and the zone. In an embodiment, the generated key can be the encryption key. In another embodiment, the generated key can be the decryption key. At step 508, the method 500 includes selecting the conversion scheme corresponding to the generated key. In an embodiment, the method 500 allows the converter unit 204 to select the conversion scheme corresponding to the generated key. In another embodiment, the method 500 allows the converter unit 306 to select the conversion scheme corresponding to the generated key. In an embodiment, the conversion scheme can be the encryption scheme. In another embodiment, the conversion scheme can be the decryption scheme.

At step 510, the method 500 includes converting the data from the first format to the second format using the conversion scheme. In an embodiment, the method 500 allows the converter unit 204 to convert the data from the first format to the second format using the conversion scheme. In another embodiment, the method 500 allows the converter unit 306 to convert the data from the first format to the second format using the conversion scheme. In an embodiment, the first format is the open format and the second format is the protected format. In another embodiment, the first format is the protected format and the second format is the open format. At step 512, the method 500 includes performing the action on the data in the second format. In an embodiment, the method 500 allows the controller unit 206 to perform the action on the data in the second format. In another embodiment, the method 500 allows the controller unit 308 to perform the action on the data in the first format.

In an embodiment, the action includes storing the data in the second format in the electronic device, sending the data in the second format to another electronic device.

In an example, consider a scenario where the user enters a private zone (i.e., which is highly secured zone) and tries to establish the secure communication channel through the mobile phone with the server. The mobile phone determines the parameters associated with the user and the zone. After determining the parameters, the mobile phone generates the encryption key. By using the generated encryption key, the mobile phone selects the encryption scheme to convert the data from the open format to the encrypted format (i.e., protected format).

In another example, consider a scenario where the server receives the data in the encrypted format. After receiving the data, the server determines the parameters associated with the user and the zone from where the communication is originated. Based on the parameters, the server generates the decryption key. By using the generated decryption key, the server selects the decryption scheme to covert the data from the encrypted format to the open format.

The various actions, acts, blocks, steps, or the like in the method 500 may be performed in the order presented, in a different order or simultaneously. Further, in some embodiments, some of the actions, acts, blocks, steps, or the like may be omitted, added, modified, skipped, or the like without departing from the scope of the invention.

Figure 6:
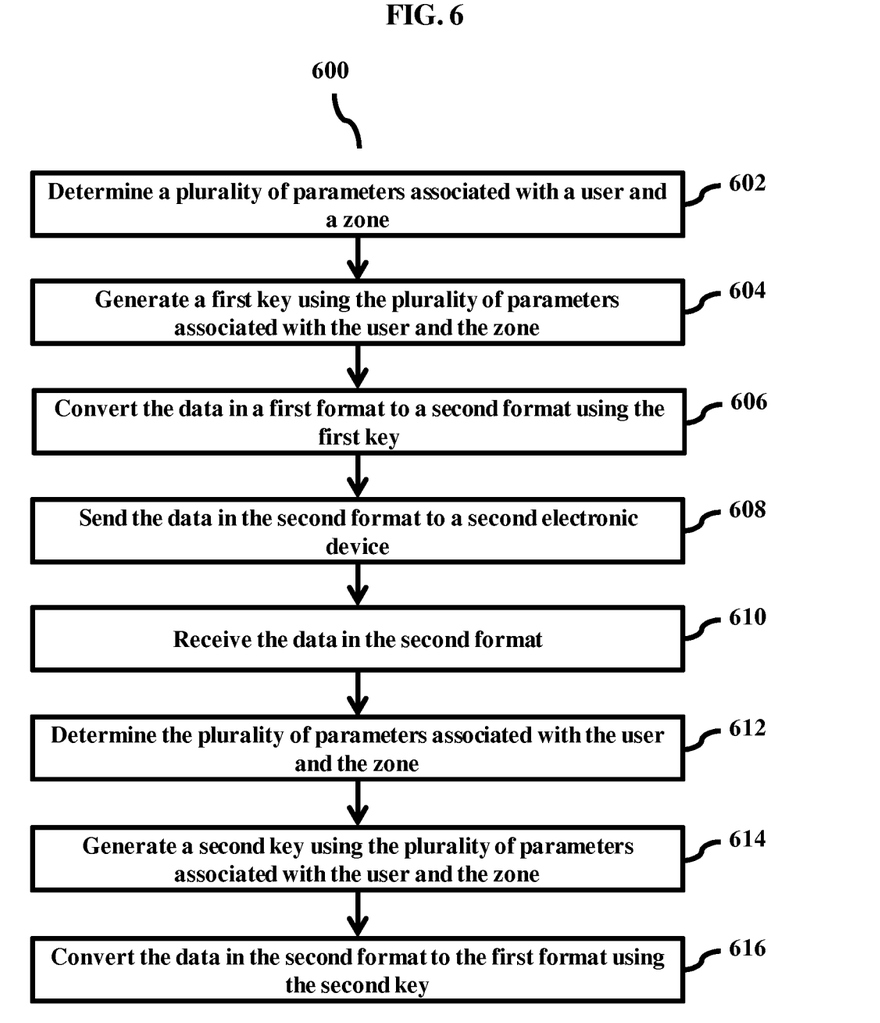
FIG. 6 is a flow chart illustrating another method for converting data, according to embodiments disclosed herein.

FIG. 6 is a flow chart illustrating a method 600 for converting data, according to embodiments disclosed herein. At step 602, the method 600 includes determining the plurality of parameters associated with the user and the zone. The method 600 allows the key generator unit 202 to determine the plurality of parameters associated with the user and the zone. In an embodiment, the parameter associated with the zone includes the location key, the zone key, the zone identifier, the level of security, the dynamic number associated with the zone, the key size, and the type of conversion scheme to be used. In an embodiment, the parameter associated with the user includes the user identifier, the application identifier, the application key, the user application key, the service key, and the device key.

At step 604, the method 600 includes generating the first key using the plurality of parameters associated with the user and the zone. The method 600 allows the key generator unit 202 to generate the first key using the plurality of parameters associated with the user and the zone. In an example, the first key is the encryption key. At step 606, the method 600 includes converting the data in the first format to the second format using the first key. The method 600 allows the converter unit 204 to convert the data in the first format to the second format using the first key. In an embodiment, the first format is the open format and the second format is the protected format.

At step 608, the method 600 includes sending the data in the second format to the second electronic device. The method 600 allows the first electronic device 102 to send the data in the second format to the second electronic device 104. At step 610, the method 600 includes receiving the data in the second format. The method 600 allows the second electronic device 104 to receive the data in the second format. At step 612, the method 600 includes determining the plurality of parameters associated with the user and the zone. The method 600 allows the second electronic device 104 to determine the plurality of parameters associated with the user and the zone.

At step 614, the method 600 includes generating the second key using the plurality of parameters associated with the user and the zone. The method 600 allows the second electronic device 104 to generate the second key using the plurality of parameters associated with the user and the zone. At step 616, the method 600 includes converting the data in the second format to the first format using the second key. The method 600 allows the second electronic device 104 to convert the data in the second format to the first format using the second key.

In an example, consider a scenario where the user enters a public zone (i.e., which is highly unsecured zone) and tries to establish the secure communication channel through the mobile phone with the server. The mobile phone determines the parameters associated with the user and the zone. After determining the parameters, the mobile phone generates the encryption key. By using the generated encryption key, the mobile phone selects the encryption scheme to convert the data into the encrypted format (i.e., protected format). The mobile phone sends the encrypted data to the server in the more secured way.

After receiving the data in the encrypted format, the server determines the parameters associated with the user and the zone. Based on the parameters, the server generates the decryption key. By using the generated decryption key, the server selects the decryption scheme to decrypt the data.

The various actions, acts, blocks, steps, or the like in the method 600 may be performed in the order presented, in a different order or simultaneously. Further, in some embodiments, some of the actions, acts, blocks, steps, or the like may be omitted, added, modified, skipped, or the like without departing from the scope of the invention.

Figure 7:
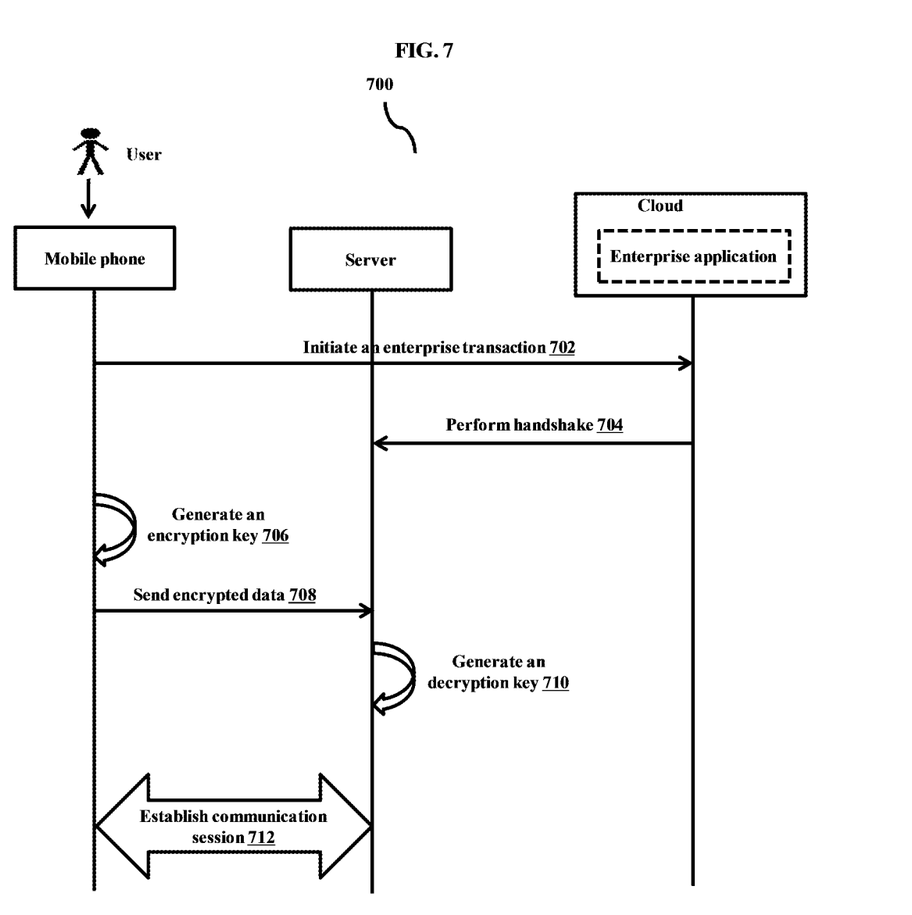
FIG. 7 illustrates an example embodiment for converting data, according to embodiments disclosed herein.

FIG. 7 illustrates an example sequence diagram 700 for converting data, according to embodiments as disclosed herein. Consider a scenario where a user enters a restaurant (i.e., public zone) and tries to establish a communication session with a server by using a mobile phone. Following steps may be performed to establish the communication session between the mobile phone and the server.

Step-702: The user may access, through the mobile phone, an enterprise application in a cloud by using a Wireless Fidelity (Wi-Fi) provided by the restaurant to initiate an enterprise transaction as shown in the FIG. 7.

Step-704: The enterprise application in the cloud performs a handshake with the server along with the user identifier, the application identifier, and the location related information.

Step-706: The mobile phone associated with the user generates the encryption key based on the classification of the restaurant. Based on the encryption key, the encryption scheme is selected based on the stored information in the mobile phone. The encryption scheme is used for encryption of the communication with the server.

Step-708: The mobile phone encrypts the data with the generated key and sends the encrypted data to the server.

Step-710: After receiving the encrypted data, the server utilizes the handshake information such as the user application key and the location identifier information to generate the decryption key of relevant size and the decryption scheme to be used based on the information stored in the server.

Step-712: The server decrypts the data with the decryption key. Thus, the communication session is established between the mobile phone associated with the user and the server.

Figure 8:
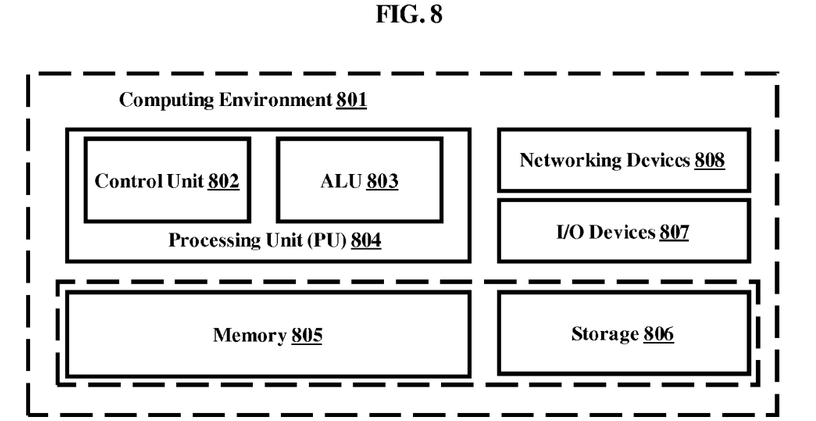
FIG. 8 illustrates a computing environment implementing the method for converting data in an electronic device, according to embodiments disclosed herein.

FIG. 8 illustrates a computing environment implementing the method and system for converting data in the electronic device, according to embodiments as disclosed herein. As depicted in the figure, the computing environment 801 comprises at least one processing unit 804 that is equipped with a control unit 802 and an Arithmetic Logic Unit (ALU) 803, a memory 805, a storage unit 806, plurality of networking devices 808 and a plurality Input output (I/O) devices 807. The processing unit 804 is responsible for processing the instructions of the schemes. The processing unit 804 receives commands from the control unit in order to perform its processing. Further, any logical and arithmetic operations involved in the execution of the instructions are computed with the help of the ALU 803.

The overall computing environment 801 can be composed of multiple homogeneous or heterogeneous cores, multiple CPUs of different kinds, special media and other accelerators. The processing unit 804 is responsible for processing the instructions of the schemes. Further, the plurality of processing units 804 may be located on a single chip or over multiple chips.

The scheme comprising of instructions and codes required for the implementation are stored in either the memory unit 805 or the storage 806 or both. At the time of execution, the instructions may be fetched from the corresponding memory 805 or storage 806, and executed by the processing unit 804.

In case of any hardware implementations various networking devices 808 or external I/O devices 807 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1a through 8 include blocks which can be at least one of a hardware device, or a combination of hardware device and software units.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for converting data in an electronic device, the method comprising:
    detecting a zone of a user by determining a geographic location of the electronic device;
    detecting an application running at the electronic device at the detected zone;
    determining by a key generator parameters associated with said user based on the detected application, wherein the parameters associated with the user comprise a user identifier, an application identifier, an application key, a user application key, a service key, and a device key;

determining by the key generator parameters associated with said zone of said user based on the detected geographical location, wherein said parameters associated with said zone comprise a level of security associated with said zone, a key size, and a type of conversion scheme to be used;

generating by said key generator a key to be used for converting said data using said parameters associated with said user and said parameters associated with said zone;

automatically selecting by a converter said type of conversion scheme to be used for converting said data from a plurality of conversion schemes, wherein said conversion scheme is defined based on said level of security associated with said zone;

converting by said converter said data in said electronic device from a first format to a second format using said generated key and said selected type of conversion scheme; and performing by a controller at least one action on said data in said second format.

2. The method of claim 1, wherein each of said conversion schemes are dynamically modified based on said level of security associated with said zone, wherein said level of security classifies said zone as one of a highly secured zone, a medium secured zone, and an unsecured zone.

3. The method of claim 1, wherein said action comprises at least one of storing said data in said second format in said electronic device, and sending said data in said second format to another electronic device.

4. The method of claim 1, wherein said parameters associated with said zone further comprise a location key, a zone key, a zone identifier, and a dynamic number associated with a zone.

5. The method of claim 1, wherein at least one said parameter associated with said zone is used to dynamically modify a size of said generated key for converting said data.

6. The method of claim 1, wherein said first format is an open format and said second format is a protected format, and wherein said generated key used for converting said data is not exchanged with another electronic device.

7. The method of claim 1, wherein said first format is a protected format and said second format is an open format, and wherein said generated key used for converting said data is not exchanged with another electronic device.

8. A method for converting data, the method comprising:
detecting a zone of a user by determining a geographic location of a first electronic device;
detecting an application running at the first electronic device at the detected zone;
determine, at the first electronic device, parameters associated with said user based on the detected application, wherein the parameters associated with the user comprise a user identifier, an application identifier, an application key, a user application key, a service key, and a device key;
determine, at the first electronic device, parameters associated with said zone of said user based on the detected geographical location, wherein said parameters associated with said zone comprise a level of security associated with said zone, a key size, and a type of conversion scheme to be used;
generating, at said first electronic device, a first key to be used for conversion said data using said parameters associated with said user and said parameters associated with said zone, wherein a size of said first key is defined based on said key size indicated in said parameters associated with said zone;
automatically selecting at said first electronic device said type of conversion scheme from a plurality of conversion schemes to be used for converting said data, wherein said conversion scheme is defined based on said level of security associated with said zone;
converting, at said first electronic device, said data in a first format to a second format using said first key and said selected type of conversion scheme; and
sending, by said first electronic device, said data in said second format to a second electronic device.

9. The method of claim 8, wherein said method further comprising:
receiving, at said second electronic device, said data in said second format;
detecting, at said second electronic device, the geographic location of said zone from where communication of said data is originated;
determining, at said second electronic device, said parameters associated with said user and said parameters associated with said zone;
generating, at said second electronic device, a second key to be used for converting said data in said second format using said parameters associated with said user and said parameters associated with said zone;
automatically selecting, at said second electronic device, a type of conversion scheme from a plurality of conversion schemes to be used for converting said data in said second format, wherein said conversion scheme is defined based on said level of security associated with said zone; and
converting, at said second electronic device, said data in said second format to said first format using said second key and said selected type of conversion scheme.

10. The method of claim 9, wherein said second key is generated independent of said first key, and wherein said first electronic device does not exchange said first key to be used for converting said data with said second electronic device.

11. The method of claim 8, wherein said parameters associated with said zone further comprise a location key, a zone key, a zone identifier, and a dynamic number associated with a zone.

12. The method of claim 8, wherein at least one said parameter associated with said zone is used to dynamically modify said conversion scheme used for converting said data based on said level of security associated with said zone, wherein said level of security classifies said zone as one of a highly secured zone, a medium secured zone, and an unsecured zone.

13. The method of claim 8, wherein said first format is an open format and said second format is a protected format.

14. An electronic device for converting data, the electronic device comprising:
a key generator, a converter, and a controller implemented through at least one hardware element of the electronic device for converting the data, wherein the key generator is configured to:
detect a zone of a user by determining a geographic location of the electronic device;
detect an application running at the electronic device at the detected zone;
determine parameters associated with said user based on the detected application, wherein the parameters associated with the user comprise a user identifier, an application identifier, an application key, a user application key, a service key, and a device key;
determine parameters associated with said zone of said user, wherein said parameters associated with said zone comprise a level of security associated with said zone, a key size, and a type of conversion scheme to be used; and
generate a key to be used for converting said data using said parameters associated with said user and said parameters associated with said zone;
wherein the converter is configured to:
automatically select said type of conversion scheme from a plurality of conversion schemes to be used for converting said data, wherein said conversion scheme is defined based on said level of security associated with said zone; and
convert said data in said electronic device from a first format to a second format using said generated key and said selected type of conversion scheme; and
wherein the controller is configured to:
perform at least one action on said data in said second format.

15. The electronic device of claim 14, wherein each of said conversion schemes is dynamically modified based on said level of security associated with said zone, wherein said level of security classifies said zone as one of a highly secured zone, a medium secured zone, and an unsecured zone.

16. The electronic device of claim 14, wherein said action comprises at least one of store said data in said second format in said electronic device, and send said data in said second format to another electronic device.

17. The electronic device of claim 14, wherein said parameters associated with said zone further comprise a location key, a zone key, and a dynamic number associated with a zone.

18. The electronic device of claim 14, wherein at least one said parameter associated with said zone is used to dynamically modify a size of said generated key used for converting said data.

19. The electronic device of claim 14, wherein said first format is an open format and said second format is a protected format, and wherein said generated key used for converting said data is not exchanged with another electronic device.

20. The electronic device of claim 14, wherein said first format is a protected format and said second format is an open format, and wherein said generated key used for converting said data is not exchanged with another electronic device.

21. A system for converting data, the system comprising:
a first electronic device configured to:
detect a zone of a user by determining a geographic location of the first electronic device;
detect an application running at the first electronic device at the detected zone;
determine parameters associated with said user based on the detected application, wherein the parameters associated with the user comprise a user identifier, an application identifier, an application key, a user application key, a service key, and a device key;
determine parameters associated with said zone based on the detected geographical location, wherein said parameters associated with said zone comprise a level of security associated with said zone, a key size, and a type of conversion scheme to be used;
generate a first key to be used for converting said data using said parameters associated with said user and said parameters associated with said zone, wherein a size of said first key is defined based on said key size indicated in said parameters associated with said zone;
automatically select said type of conversion scheme from a plurality of conversion schemes to be used for converting said data, wherein said conversion scheme is defined based on said level of security associated with said zone;
convert said data in a first format to a second format using said first key and said selected type of conversion scheme; and
send said data in said second format; and
a second electronic device configured to:
receive said data in said second format;
detect the geographic location of said zone of said user from where communication of said data is originated;
determine said parameters associated with said user and said parameters associated with said zone;
generate a second key to be used for converting said data in said second format using said parameters associated with said user and said parameters associated with said zone;
automatically select a type of conversion scheme from a plurality of conversion schemes to be used for converting said data in said second format, wherein said conversion scheme is defined based on said level of security associated with said zone; and
convert said data in said second format to said first format using said second key and said selected type of conversion scheme.

22. The system of claim 21, wherein said second key is generated independent of said first key, wherein said first electronic device does not exchange said first key used for converting said data with said second electronic device.

23. The system of claim 21, wherein said parameters associated with said zone further comprise a location key, a zone key, a zone identifier, and a dynamic number associated with a zone.

24. The system of claim 21, wherein at least one said parameter associated with said zone is used to dynamically modify said conversion scheme used for converting said data.

25. The system of claim 21, wherein said first format is an open format and said second format is a protected format.

26. A computer program product comprising computer executable program code recorded on a computer readable non-transitory storage medium, said computer executable program code when executed causing the actions including:
detecting a zone of a user by determining a geographic location of the electronic device;
detecting an application running at the electronic device at the detected zone;
determining parameters associated with said user based on the detected application, wherein the parameters associated with the user comprise a user identifier, an application identifier, an application key, a user application key, a service key, and a device key;
determining parameters associated with said zone of said user based on the detected geographical location, wherein said parameters associated with said zone comprise a level of security associated with said zone, a key size, and a type of conversion scheme to be used;
generating a key to be used for converting said data using said parameters associated with said user and said parameters associated with said zone;

automatically selecting said type of conversion scheme from a plurality of conversion schemes to be used for converting said data, wherein said conversion scheme is defined based on said level of security associated with said zone;

converting said data from a first format to a second format using generated key and said selected type of conversion scheme; and performing at least one action on said data in said second format.

27. A computer program product comprising computer executable program code recorded on a computer readable non-transitory storage medium, said computer executable program code when executed causing the actions including:

detecting, at a first electronic device, a zone of a user by determining a geographic location of a first electronic device;

detecting an application running at the electronic device at the detected zone;

determining, at said first electronic device, parameters associated with said user based on the detected application, wherein the parameters associated with the user comprise a user identifier, an application identifier, an application key, a user application key, a service key, and a device key;

determining, at said first electronic device parameters associated with said zone of said user based on the detected geographical location, wherein said parameters associated with said zone comprise a level of security associated with said zone, a key size, and a type of conversion scheme to be used;

generating, at said first electronic device, a first key to be used for converting said data using said parameters associated with said user and said parameters associated with said zone, wherein a size of said first key is defined based on said key size indicated in said parameters associated with said zone;

automatically selecting at said first electronic device said type of conversion scheme from a plurality of conversion schemes to be used for converting said data, wherein said conversion scheme is defined based on said level of security associated with said zone;

converting, at said first electronic device, said data in a first format to a second format using said first key and said selected type of conversion scheme;

sending, by said first electronic device, said data in said second format to a second electronic device;

receiving, at said second electronic device, said data in said second format;

detecting, by said second electronic device, the geographic location of said zone from where communication of said data is originated;

determining, at said second electronic device, said parameters associated with said user and said parameters associated with said zone;

generating, at said second electronic device, a second key for converting said data in said second format using said parameters associated with said user and said parameters associated with said zone;

automatically selecting at said second electronic device a type of conversion scheme from a plurality of conversion schemes to be used for converting said data in said second format, wherein said conversion scheme is defined based on said level of security associated with said zone;

converting, at said second electronic device, said data in said second format to said first format using said second key and said selected type of conversion scheme; and performing, at said second electronic device, at least one action on said data in said first format.

* * * * *